(12) United States Patent
Williams

(10) Patent No.: US 9,477,987 B2
(45) Date of Patent: Oct. 25, 2016

(54) METHODS AND APPARATUS RELATED TO PRODUCING A HOUSEHOLD ECONOMIC FORECAST

(71) Applicant: FrontPaw Solutions, LLC, Ashburn, VA (US)

(72) Inventor: David Garth Williams, Madison, NJ (US)

(73) Assignee: FrontPaw Solutions, LLC, Ashburn, VA (US)

( * ) Notice: Subject to any disclaimer, the term of this patent is extended or adjusted under 35 U.S.C. 154(b) by 0 days.

(21) Appl. No.: 13/786,348

(22) Filed: Mar. 5, 2013

(65) Prior Publication Data

US 2013/0232047 A1    Sep. 5, 2013

Related U.S. Application Data

(60) Provisional application No. 61/606,517, filed on Mar. 5, 2012.

(51) Int. Cl.
*G06Q 40/00* (2012.01)

(52) U.S. Cl.
CPC .................................. *G06Q 40/00* (2013.01)

(58) Field of Classification Search
USPC .......................................... 705/35, 36 R, 38
See application file for complete search history.

(56) References Cited

U.S. PATENT DOCUMENTS

| | | | |
|---|---|---|---|
| 5,058,009 A | 10/1991 | Yoshino et al. | |
| 5,222,019 A | 6/1993 | Yoshino et al. | |
| 5,245,536 A | 9/1993 | Hsieh | |
| 6,430,542 B1 | 8/2002 | Moran | |
| 6,684,190 B1 | 1/2004 | Powers et al. | |
| 7,401,040 B2* | 7/2008 | Sloan | G06Q 40/00 705/35 |
| 7,752,090 B2* | 7/2010 | Trainer | G06Q 40/00 705/30 |
| 7,840,463 B1 | 11/2010 | Davis | |
| 7,921,048 B2* | 4/2011 | Sloan | G06Q 40/02 705/36 R |
| 8,069,103 B1 | 11/2011 | Davis | |
| 2003/0061132 A1* | 3/2003 | Yu et al. | 705/30 |
| 2004/0267651 A1* | 12/2004 | Jenson et al. | 705/36 |
| 2005/0004856 A1* | 1/2005 | Brose et al. | 705/35 |
| 2006/0010060 A1* | 1/2006 | Jones et al. | 705/35 |
| 2007/0239572 A1* | 10/2007 | Harris | G06Q 40/00 705/35 |
| 2007/0244777 A1* | 10/2007 | Torre et al. | 705/35 |
| 2008/0235754 A1* | 9/2008 | Wiseman et al. | 726/1 |
| 2010/0161471 A1* | 6/2010 | Fendick | G06Q 40/06 705/35 |
| 2010/0185561 A1* | 7/2010 | Torre et al. | 705/36 R |
| 2010/0287086 A1* | 11/2010 | Harris et al. | 705/35 |
| 2011/0004546 A1* | 1/2011 | Thomas | 705/39 |

* cited by examiner

*Primary Examiner* — Lalita M Hamilton
(74) *Attorney, Agent, or Firm* — Brake Hughes Bellermann LLP

(57) ABSTRACT

In one general aspect, a non-transitory computer-readable storage medium can be configured to store instructions that when executed cause a processor to perform a process. The process can include receiving, at a first economic conversion block, a first set of parameter values associated with a user identifier, and receiving, at a second economic conversion block, a second set of parameter values associated with the user identifier. The first economic conversion block and the second economic conversion block can be included in a library of conversion blocks. The first economic conversion block and the second economic conversion block can be selected from a library of economic conversion blocks and defining an economic unit.

16 Claims, 5 Drawing Sheets

METHODS AND APPARATUS RELATED TO PRODUCING A HOUSEHOLD ECONOMIC FORECAST

RELATED APPLICATION

This application claims priority to and the benefit of U.S. Provisional Patent Application Ser. No. 61/606,517, filed on Mar. 5, 2012, entitled, "Personal Economics Modeling System," which is incorporated herein by reference in its entirety.

TECHNICAL FIELD

This description relates to methods and apparatus related to producing an economic forecast for a household.

BACKGROUND

A variety of financial calculation tools exist for performing financial analysis of data input by a user. However, these financial calculation tools fail to take into account many of the factors that may be important for a user in making economic decisions. In addition, these financial calculation tools are confined to closed architectures that may prohibit the analysis of data from a variety of sources. Thus, a need exists for systems, methods, and apparatus to address the shortfalls of present technology and to provide other new and innovative features.

SUMMARY

In one general aspect, a non-transitory computer-readable storage medium can be configured to store instructions that when executed cause a processor to perform a process. The process can include receiving, at a first economic conversion block, a first set of parameter values associated with a user identifier, and receiving, at a second economic conversion block, a second set of parameter values associated with the user identifier. The first economic conversion block and the second economic conversion block can be included in a library of conversion blocks. The first economic conversion block and the second economic conversion block can be selected from a library of economic conversion blocks and defining an economic unit. The process can also include defining configuration data corresponding with the economic unit. The configuration data can be configured to trigger processing at a subset of a plurality of economic unit processing engines corresponding with the first economic conversion block and corresponding with the second economic conversion block to produce an economic forecast.

The details of one or more implementations are set forth in the accompanying drawings and the description below. Other features will be apparent from the description and drawings, and from the claims.

DETAILED DESCRIPTION

Figure 1:
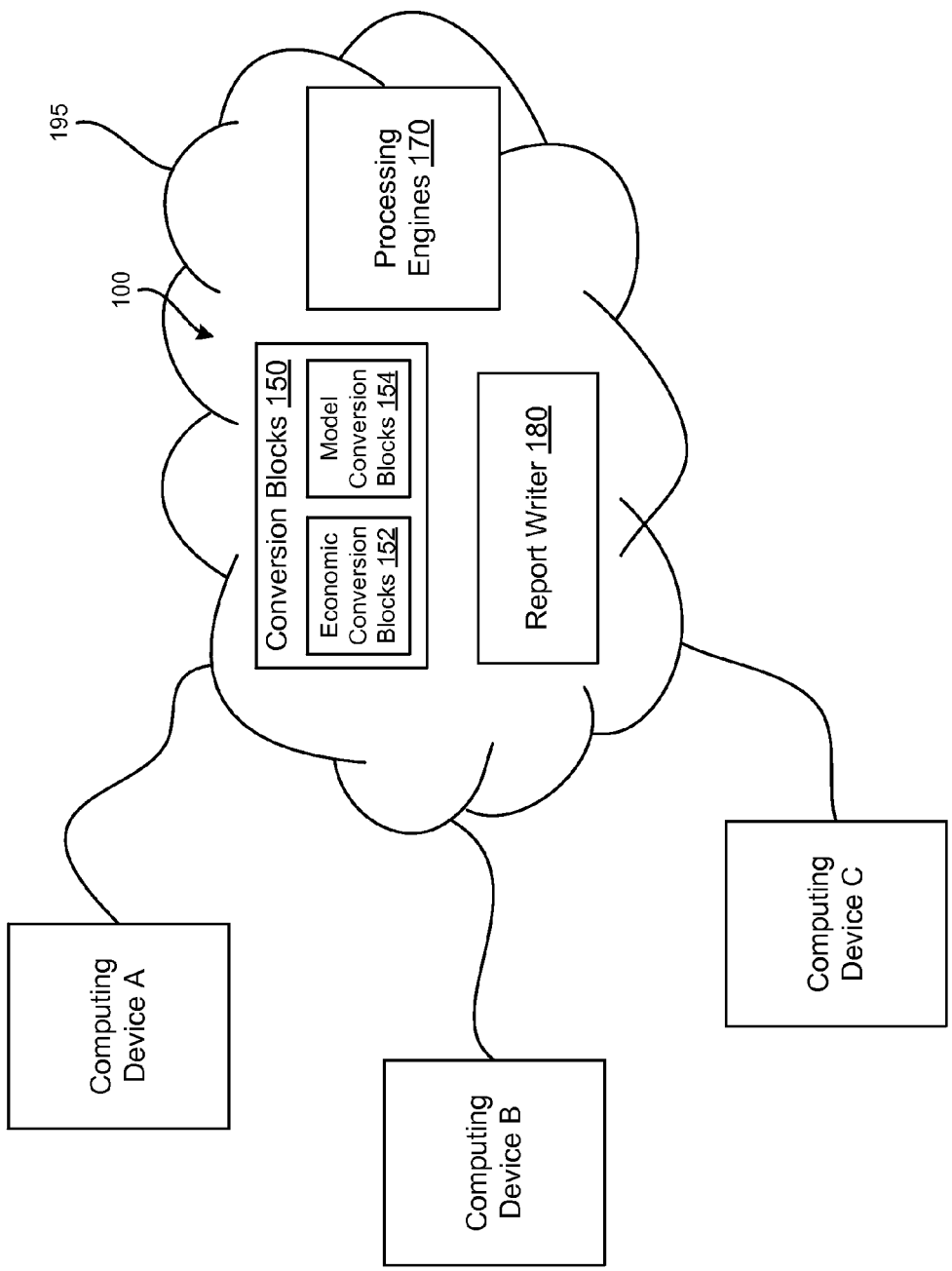
FIG. 1 is a diagram that illustrates an economic modeling system.

FIG. 1 is a diagram that illustrates an economic modeling system 100. The economic modeling system 100 includes three primary elements: conversion blocks 150, processing engines 170, and a report writer 180. The economic modeling system 100 is included in a processing environment 195. This processing environment 195 may be any combination of hardware and software that may be distributed or co-located in a network (e.g., a wide area network WAN, a local area network (LAN)).

The conversion blocks 150 are configured (e.g., individually configured, collectively configured) to represent various factors that have a financial, or more broadly, an economic impact on the user (e.g., a household (which can include a single individual)) of the economic modeling system 100. In one implementation of this economic modeling system 100, the conversion blocks 150 can be divided into two categories—economic conversion blocks 152 and modeling conversion blocks 154.

The economic conversion blocks 152 (which can be a library of economic conversion blocks) can be configured to process a first category of economic information. This economic information can include, for example, the initial conditions of an economic model, which can be referred to as parameter values. These initial conditions may include a combination of economic data as well financial data as described later. In some implementations, the parameter values can include current, past, or future elements such as income generating activities, physical assets, financial assets, liabilities, and expense generating activities, of the user.

The model conversion blocks 154 (which can be a library of model conversion blocks) can be configured to process a second category of economic information. This category of economic information may include a variety of events, assumptions, and strategies that can be associated with a model. This category of economic information can be combined to create (or define) a user-envisioned model of future economic conditions and choices. The combination of the first category of economic information represented by the economic conversion blocks 152 and the second category of economic information represented by the model conversion blocks 154 can be configured to represent any combination of past, present, and/or future economic conditions for the user.

In some implementations, the combined input parameters and configuration of the conversion blocks 150 (which can include representations of both categories of economic information) can be provided as standardized economic information that can be processed by the processing engines 170. In this way, the conversion blocks 150 included in the economic modeling system 100 can be used singly or together to create a representation of a user's past, present, and/or future economic condition. The level of precision or crudeness of an economic forecast produced using the economic modeling system 100 can be increased (decreased) by the user adding (removing) one or more individual conversion blocks (e.g., individual economic conversion blocks 152, individual model conversion blocks 154) from the conversion blocks 150. These conversion blocks 150 may be configured in such a way that they can simulate virtually any conceivable economic event or transaction. The economic forecast can be a projection of a possible economic state that is based on a variety of assumptions, etc. that is not necessarily guaranteed.

The economic modeling system 100 allows users to select new economic conversion blocks in the conversion blocks 150 of the economic modeling system 100 without requiring design changes to the processing engine 170 or report writer 180. In other words, one or more individual block elements of the conversion blocks 150 can be modularly included or excluded. In some embodiments, the conversion blocks 150 can be referred to as a library of conversion blocks 150.

The conversion blocks 150 are referred to as conversion blocks because they are configured to represent real-world items and concepts that have an economic impact on the user. Despite the variety of conversion blocks, each is ultimately converted and aggregated, through the processing engines 170, into reporting metrics that are meaningful to the user (e.g., income, expense, assets, liabilities, and so forth).

The processing engines 170 are configured (e.g., individually configured, collectively configured) to process the parsed economic data elements into standardized datasets that are arranged to represent a user's past, current, and/or future economic condition. The processing engines 170 are configured to process a wide variety of economic data elements including financial data, economic utility data, and time preference data to name a few.

The processing engines 170 can also be configured to provide economic forecasts in a standardized format to the report writer 180 which allows the report writer 180 to generate representations of the user's economic condition using formats that are meaningful to the user, including such things as graphs, tables, charts, and various other types of displays including interactive displays.

Because the processing engines 170 receive the parsed economic data in a standardized format from the economic conversion blocks 150, and provide the results to the report writer 180 in a standardized format, the processing engines 170 are independent from the design, location, or user preferences associated with the conversion blocks 150 and/or the report writer 180. This allows the processing engines 170 to be deployed, maintained, enhanced, or licensed separately from the conversion blocks 150 and/or the report writer 180. It also allows live updates (e.g., real-time updates) of the conversion blocks 150 and the report writer 180 to take place without taking the entire economic modeling system 100 out of service for maintenance.

In addition, the economic modeling system 100 can be adapted for a variety of users with different economic modeling goals. A first user (e.g., via a user account) can use a first subset of the conversion blocks 150 and corresponding processing engines 170 to produce a first economic forecast using economic information associated with the first user, and a second user (e.g., via a user account) can independently use a second subset of the conversion blocks 150 and corresponding processing engines 170 to produce a second economic forecast using economic information associated with the second user. The first subset can be different than the second subset. In some implementations, the first user can share the first subset with the second user so that the second user may use the first subset for economic modeling purposes.

The report writer 180 is configured to produce one or more results of the processing engines 170 in a format that can be consumed by a user of the economic modeling system 100. The report writer 180 can be configured to receive data in a standardized format from the processing engines 170 that characterizes all or any part of the user's past, current, and/or future economic condition. The report writer 180 may be as simple or complex as the user designates and is thus sufficiently flexible to present this information visually, audibly, interactively or in any other representation that is meaningful to the user. The report writer 180 can be configured to drill down or expand representations of the economic data with or without additional input from the processing engines 170. The report writer 180 can be configured to store the representations for later use or stream the representations to any presentation media (e.g., a mobile phone, a personal computer, a television with one or more processors, and/or so forth) designated by the user. Because the report writer 180 is configured to receive the economic data in a standardized format, the report writer 180 can be provided by any vendor or device that accepts this standardized format.

Computing devices A, B, and/or C can be used by one or more users to trigger operations of one or more components of the economic modeling system 100. The operation(s) can be triggered via a user interface. For example, input into the economic modeling system 100 can be provided via computing device A, portions of the conversion blocks 150 and/or processing engines 170 can be selected via the computing device A, and an output can be consumed and/or manipulated via the computing device A. In some implementations, the computing devices A, B, and/or C can be, for example, a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. The computing devices A, B, and/or C can be configured to operate based on one or more platforms (e.g., one or more similar or different platforms) that can include one or more types of hardware, software, firmware, operating systems, runtime libraries, and/or so forth.

Similarly, the components of the economic modeling system 100 can be configured to operate based on one or more platforms (e.g., one or more similar or different platforms) that can include one or more types of hardware, software, firmware, operating systems, runtime libraries, and/or so forth. In some implementations, the components of the economic modeling system 100 can be configured to operate within a cluster of devices (e.g., a server farm). In such an implementation, the functionality and processing of the components of the economic modeling system 100 can be distributed to several devices of the cluster of devices.

Although not explicitly shown, in some implementations, the components of the economic modeling system 100 can be configured to operate within, for example, a data center (e.g., a cloud computing environment), a computer system, one or more server/host devices, and/or so forth. In some implementations, the components of the economic modeling system 100 can be configured to operate within a network. Thus, the components of the economic modeling system 100 can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Figure 2:
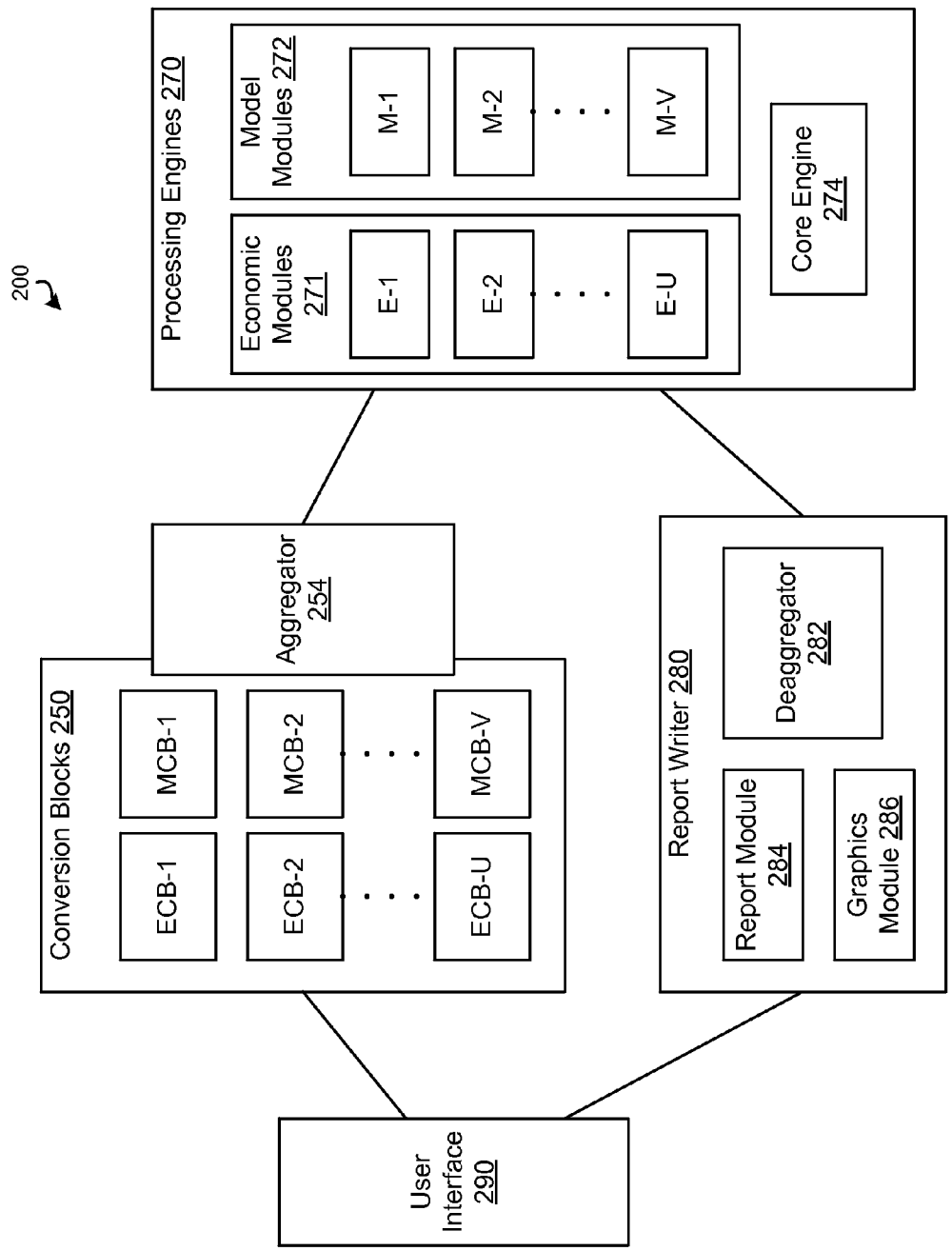
FIG. 2 is a diagram that illustrates in more detail components of an economic modeling system.

FIG. 2 is a diagram that illustrates in more detail components of an economic modeling system 200. The economic modeling system 200 is a variation of the economic modeling system 100 shown in FIG. 1.

As shown in FIG. 2, the economic modeling system 200 includes conversion blocks 250, which include a plurality of individual economic conversion blocks (ECBs) (shown as ECB-1 through ECB-U) and model conversion blocks (MCBs) (shown as MCB-1 through MCB-V) that interoperate with an aggregator 254. Each of the ECBs and MCBs in the Conversion Blocks 250 can represent an economic element that can be designated by a user as being relevant to an economic condition of the user.

Both the ECB and the MCB can be configured to process both financial and other economic data that is used to construct an economic forecast. An economic forecast is a broader concept than a financial forecast. A financial model would be a subset of an economic forecast. The field of economics recognizes that individuals can make choices based on a variety of personal preference factors, only one of which is financial data. For example, economics includes the concept of "utility" where an individual may have a preference for one product over another even though the financial factors may be identical. For example an individual may have a preference for a red car over a white car even though they cost the same. Similarly, an individual may choose a more expensive service in order to save time. For example, someone may choose to pay an extra toll in order to reduce their commute time. This is an example of a personal time preference in economic decision making. Each ECB and MCB can be configured to process financial, utility, time preference, and other data factors that may influence a user's economic decisions. The economic modeling system 200 is configured to handle this type of modeling.

The data in each ECB is associated with a corresponding set of processing instructions in the economic modules 271 (shown as E-1 through E-U) contained in the processing engines 270. In a similar manner, the data in each MCB is associated with a corresponding set of processing instructions in the model modules 272 (shown as M-1 through M-V) in the processing engines 270. These processing instructions include instructions for processing all (or at least a portion) of the financial data as well as all elements of the economic data. By selecting one or more ECB and MCB blocks from the available library (of ECB and/or MCB blocks) in the conversion blocks 250, the user can configure the processing instructions for the economic modules 271, and the model modules 272, in the processing engines 270. In some embodiments, the processing instructions can be triggered, at least in part, by configuration data, which is discussed in more detail in connection with FIG. 3.

The user can create a simple model by selecting a single ECB and a single MCB within the conversion blocks 250 or can create a more complex model using many ECBs and MCBs in the conversion blocks 250. In other words, a user can use any combination of the available libraries of ECBs and MCBs in the conversion blocks 250 to produce an economic forecast using the economic modeling system 200. The input parameters of each of the ECBs and MCBs can be received by the aggregator 254 which aggregates the input parameters into a collective configuration of standardized economic data (also can be referred to as parsed economic data) to be processed by the processing engines 270.

As shown in FIG. 2, the economic modeling system 200 includes processing engines 270 including a core engine 274, and the plurality of economic modules 271 and model modules 272. The processing engine can be configured to process the data from the conversion blocks 250 to produce a variety of information relevant to an economic forecast (which can include components of a financial forecast). The ability of the economic modules 271 and model modules 272 to process financial as well as economic data is at least one of the distinguishing factors between a traditional financial modeling apparatus and the current economic modeling apparatus. When the user selects one or more ECBs and MCBs in the conversion blocks 250, this selection automatically triggers the execution of the processing instructions associated with these conversion blocks 250 in processing engines 270. In this way, the processing engines 270 is able to process both financial and non-financial as well as other economic user preferences as part of the economic modeling system 200.

As shown in FIG. 2, the report writer 280 includes a deaggregator 282, a report module 284, and a graphics module 286. The deaggregator 282 communicates with the processing engines 270 via a standardized data format. The deaggregator 282 parses the data received from the processing engines 270 so that the economic modeling information can be made available in a user-preferred format. The deaggregator 282 can be configured to communicate information to the processing engines 270 regarding the preferred level of detail, the period of analysis or other preferences that may modify the amount or content of the information sent by the processing engines 270 to the report writer 280.

Once the data from the processing engines 270 has been deaggregated in the deaggregator 282, it then passes through one or more modules which can be configured to format the data for easy presentation to the user. An example of this module concept would be the report module 284 which can be configured to generate a variety of machine readable formats for interfacing with other systems, as well as text-based reports for the user. The graphics module 286 is an example of a module which can be configured to generate a variety of picture-based or graphics-based reports for the user. The purpose of modules such as the report module 284 and the graphics module 286 is to arrange the data in a way that can facilitate efficient and flexible presentation of the economic forecast to the user in a format that is meaningful to the user and that conforms to their individual presentation preferences.

The user interface 290 is usually located physically with a computing device of the user. It may include a combination of hardware, software, processing, memory, display, input/output, video, audio, or other devices. It includes a mechanism for optionally communicating to the report writer 280 the quantity, content, and format of the reports to be transmitted from the report writer 280 to the user interface 290 for presentation to the user. The user interface 290 can be configured to statically present the economic modeling information to the user, or it can be configured to dynamically present the economic modeling information. The presentation can be in text, pictures, interactive video images, or any other format agreeable to the user. The user interface 290 can be configured to store the economic modeling information for later retrieval or for additional post-processing by other user-designated processes or devices.

Figure 3:
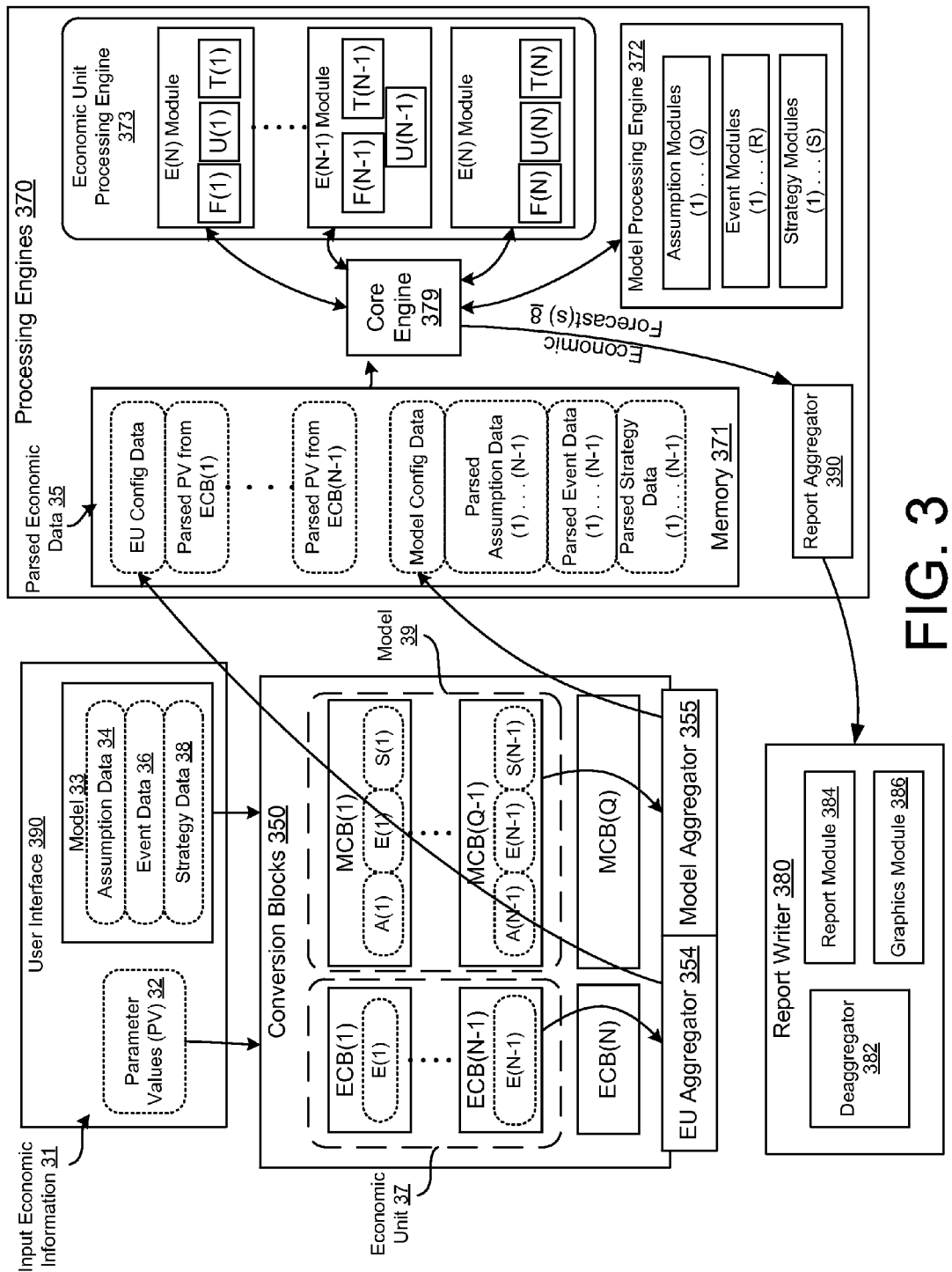
FIG. 3 illustrates one representation of the data path of the input economic information.

FIG. 3 illustrates one representation of the data path of the input economic information 31, through the user interface 390, through the conversion blocks 350, through the processing engines 370, and through the report writer 380. The user interface 390 allows the user to enter input economic information 31 that is divided into separate categories of information. One category may include parameter values (PV) 32. An example of parameter values 32 could be the color, model, make, year, price, or other characteristic of a car that the user may have some interest in including in their economic forecast, or various income and expense values. Another category may include assumptions data 34, event data 36, and strategy data 38. Examples of assumption data 34 can include, or can represent, the expected annual rate of increase in monthly income over the forecast horizon period, or the rate of inflation, or home appreciation rate. Event data 36 can include, or can represent, a job change on a designated date combined with other changes in income, expenses, or other factors. Strategy data 38 can include, or can represent, a plan of action or policy designed to achieve a major or overall aim. For example, strategy data 38 can represent the acceleration of a mortgage payoff, reduction of debt, or a plan to save for college, etc. A model 33 may include a combination of assumption data 34, event data 36, and strategy data 38 that can represent a specific grouping of economic decisions that a user may be considering. The user interface 390 may include a plurality of model 33 elements that can be selected by a user.

In addition to financial information there may also be parameters, assumptions, events or strategies that describe utility or time preference information. For example, a user's utility preferences may result in a willingness to pay 20% more for a red house rather than a brown house. Similarly a user may have time preferences that would justify their paying $300 per month more in a house payment for a house that has a 20 minute shorter commute time. Thus all input economic information 31 (both financial and non-financial information) can be organized in the user interface 390. The user interface 390 can be configured to designate which information should be associated with (e.g., received by) each individual ECB and MCB element in the conversion blocks 350.

The conversion blocks 350 can be configured to receive the parameter values (PV) 32 and the model 33 information from the user interface 390. This information is organized for processing by the economic conversion blocks (ECBs) and model conversion blocks (MCBs). As shown in FIG. 3 there may be a plurality of ECBs (1 through N) and MCBs (1 through Q) in conversion blocks 350.

An ECB typically includes parameter value (PV) 32 information about a particular economic modeling element. For example a housing ECB in the ECBs 350 may include information associated with a house. This ECB may include parameter information like address, price, mortgage balance, interest rate, etc. for a given house.

An MCB includes assumption (A), event (E), and strategy (S) information. For example an MCB may include assumption information like the expected house appreciation rate. It may include event information like a refinancing or remodeling date and price. It may also include a strategy like applying all excess income over a predetermined amount to paying off the mortgage as soon as possible ECB and MCB elements can be constructed for any economic topic, element, or purpose. In practice, this plurality of ECBs and MCBs can be selected by the user from a library of ECBs and MCBs in the conversion blocks 350 for representing an individual economic state (of the user). Users or other parties can contribute to this library by adding their own ECB and MCB designs. A user can also use an ECB or MCB provided by another user.

One innovation made possible by the conversion blocks 350 architecture is that users can share individual ECBs and MCBs or collections of ECBs and MCBs (by sharing economic unit 37 and model 39) combinations with other users. For example one user may construct a complete model for a four year college education at an in-state school. This user could then make that model available to other users who may also be considering attending the same school. Each user is able to designate how much or how little of their model they will share with others. Over time, the library of models would expand and users would be able to select from an increasingly robust assortment of economic models. User collaboration and sharing of ECB or MCB data may occur using social media or any other forms of electronic communications (which can be types of collaborative sharing environments). In some embodiments, ECBs that define the economic unit 37 can be referred to as a definition of an economic unit (which can be shared via collaboration). In some embodiments, MCBs that define the model 39 can be referred to as a definition of a model (which can be shared via collaboration).

The conversion blocks 350 include a model aggregator 355 function which aggregates the MCB information in model 39. MCB elements, consisting of assumptions, events, and strategies can be constructed by one or more users to represent any possible path for the future—termed an economic model. These aggregations of MCBs, or models, can be organized into a library from which one or more users can select a set of potential future paths in order to examine the results of making different assumptions, experience different events, or applying different strategies on their own economic situation. A typical implementation may include a plurality of model 39 data representing alternative combinations of assumptions, events, and strategies that the user may want to compare.

The economic unit (EU) Aggregator 354 in FIG. 3 can be configured to receive all (or a portion) of the financial and non-financial economic information from the full set of selected ECBs in the conversion blocks 350. This information can then be aggregated in the EU Aggregator 354 to produce an economic unit configuration data within parsed economic data 35. This parsed economic data 35 is then presented to the processing engines 370 for processing. Similarly, the model aggregator 355 in FIG. 3 can be configured to receive all (or a portion) of the financial and non-financial economic information from the full set of selected MCBs in the conversion blocks 350. This information can then be aggregated in the model aggregator 355 to produce model configuration data and parsed assumption, event, and strategy data. This parsed economic data 35 is then presented to the processing engines 370 for processing.

The processing engines 370 can be configured to receive information from the EU aggregator 354 and model aggregator 355 as parsed economic data 35. The parsed economic data 35 separates the data into data derived from the economic unit 37 and data derived from the model 39. The data derived from the economic unit 37 includes configuration information for the economic unit (EU Config Data) related to the economic unit 37 as well as parameter values (Parsed PV from ECB) for each ECB in conversion blocks 350. The data derived from model 39 includes configuration information for the model (Model Config Data) as well as parsed event data, parsed strategy data, and parsed assumption data. The combined parsed economic data 35 is loaded into memory 371. In a typical application, the economic unit 37 comprises a subset of the library of ECBs available to the user in conversion blocks 350. Similarly model 39 comprises a subset of the library of MCBs available to the user in conversion blocks 350.

In some implementations, the memory 371 can be any type of memory such as a random-access memory, a disk drive memory, flash memory, and/or so forth. In some implementations, the memory 371 can be implemented as more than one memory component (e.g., more than one RAM component or disk drive memory).

One implementation of the processing engines 370 is shown in FIG. 3. In this implementation, the core engine 379 can be configured to read the parsed economic data 35 stored in memory 371 in order to identify all of the economic conversion blocks (ECBs) and model conversion blocks (MCBs) the user has selected to include in their economic model. The core engine 379 can be configured to retrieve from a library of ECB modules (E Modules (1 through N)) contained in the economic unit processing engine 373, the set of processing instructions associated with each ECB that the user has selected in the economic unit 37. Each E module includes processing instructions configured to analyze a plurality of economic factors including financial factors, utility factors, and time preference factors. These processing instructions include a financial (F) processing instructions (configured to process the financial factors), a utility (U) processing instructions (configured to process the utility factors), and a time preference (T) processing instructions (configured to process the time preference factors). These processing instructions can be, for example, sent to (or pulled from one or more E modules) and executed at the core engine 379.

The core engine 379 also pulls from a library of assumption modules (including assumption modules 1 through Q), event modules (including event modules 1 through R), and strategy modules (including strategy modules 1 through S) contained in the model processing engine 372, the processing instructions associated with the assumptions, events, and strategies included in model 39.

The core engine 379 can be configured to apply the processing instructions (which can be referred to as economic unit processing instructions and are retrieved or defined based on the parsed economic data 35 (e.g., the economic unit configuration data and associated parameter values)) received from the economic unit processing engine 373 and the processing instructions (which can be referred to as model processing instructions and are retrieved or defined based on the parsed economic data 35 (e.g., the model configuration data and associated data)) received from the model processing engine 372 to the parsed economic data 35 contained in memory 371, to produce one or more economic forecasts 8 using a forecast generator (not shown). Each economic forecast 8 may include all or a subset of the financial (F), utility (U), time preference (T), or other economic data associated with a particular economic unit 37 and model 39 over the forecast period of the economic model. In other words, the economic forecast can be based on a financial component, a utility component, and time preference component. The economic forecast(s) 8 are then sent to the report aggregator 390 where the data is aggregated and sent to the report writer 380 for presentation to the user. In some implementations, the economic forecast (s) 8 can be iteratively modified using a feedback process as described below in connection with FIG. 4.

In some implementations, the economic forecast 8 is a financial forecast. In some implementations, the economic forecast is a financial forecast produced based on a financial analysis (performed at one or more of the financial processing elements F), and modified based on at least one of a utility analysis (performed at one or more of the utility processing elements U) or a time preference analysis (performed at one or more of the time preference processing elements T).

In some implementations, at least one of the financial analysis, the utility analysis, or the time preference analysis is modified by at least one of processing of parsed assumption data performed by one or more of the assumption modules of the model processing engine 372, processing of parsed event data performed by one or more of the event modules of the model processing engine 372, or processing of parsed strategy data performed by one or more of the strategy modules of the model processing engine 372.

Figure 4:
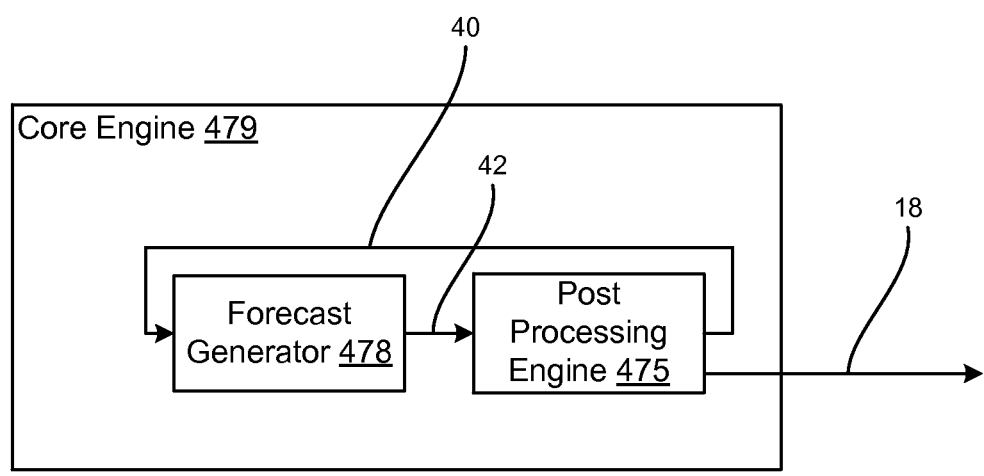
FIG. 4 represents the concept of feedback in a core engine

FIG. 4 represents the concept of feedback in a core engine 479. The feedback concept represented in FIG. 4 is implemented in the core engine 379 shown in FIG. 3. The feedback concept is typically used as part of the implementation of an economic strategy. For example a user may have a strategy to apply all cash balances in excess of some reserve amount to paying down outstanding debt balances. In this example, a forecast generator 478 produces a preliminary forecast 42 based on the data and processing instructions referred to as inputs to the core engine 379 in FIG. 3. This preliminary forecast 42 then passes through a post processing engine 475 where a variety of checks are performed at the post processing engine 475 to determine whether the preliminary forecast 42 conforms to the strategy and other preferences of the user. The preliminary forecast 42 can be modified (via feedback) based on the check that is performed to an intermediate forecast that is further modified within the core engine 479 or to a final forecast 18 that is output from the core engine 479. In some implementations, any of the data (e.g., any portion of the parsed economic data 35 shown in FIG. 3) that is used to produce a forecast (e.g., a preliminary forecast, an intermediate forecast) can be modified (e.g., modified parsed economic data) based on the feedback loop. In some implementations this process can be iteratively performed until the final forecast 18 is produced.

For example, one of the checks can be performed to determine if the cash account balance is in excess of the specified reserve amount. If this is the case, the post processing engine 475 can generate a set of modified inputs 40 (e.g., revised inputs, modified parsed economic data) which are configured to reduce the cash balance to the designated reserve amount, and to take the excess cash balance amount and apply it to paying down outstanding debt balances in conformance with the user-specified strategy.

In some implementations, one or more check conditions can be defined within one or more strategies for a given model (e.g., the model 39 shown in FIG. 3). In other words, a strategy defined by a user may involve a number of checks to ensure that the user's strategy preferences are properly implemented in the model. The specific checks performed in the post processing engine 475 are designated when the user specifies their preferred MCBs from the library of MCBs in the conversion blocks 350 shown in FIG. 3. Each MCB with an S (strategy) component is associated with a set of strategy processing instructions in the strategy modules of the model processing engine 372 in FIG. 3. Therefore, when a user selects the MCBs to be used in their model 39 of FIG. 3, they are by association selecting the checks that will be performed on the preliminary forecast 42 by the model processing engine 372 in the post processing engines 370 in FIG. 3.

Figure 5:
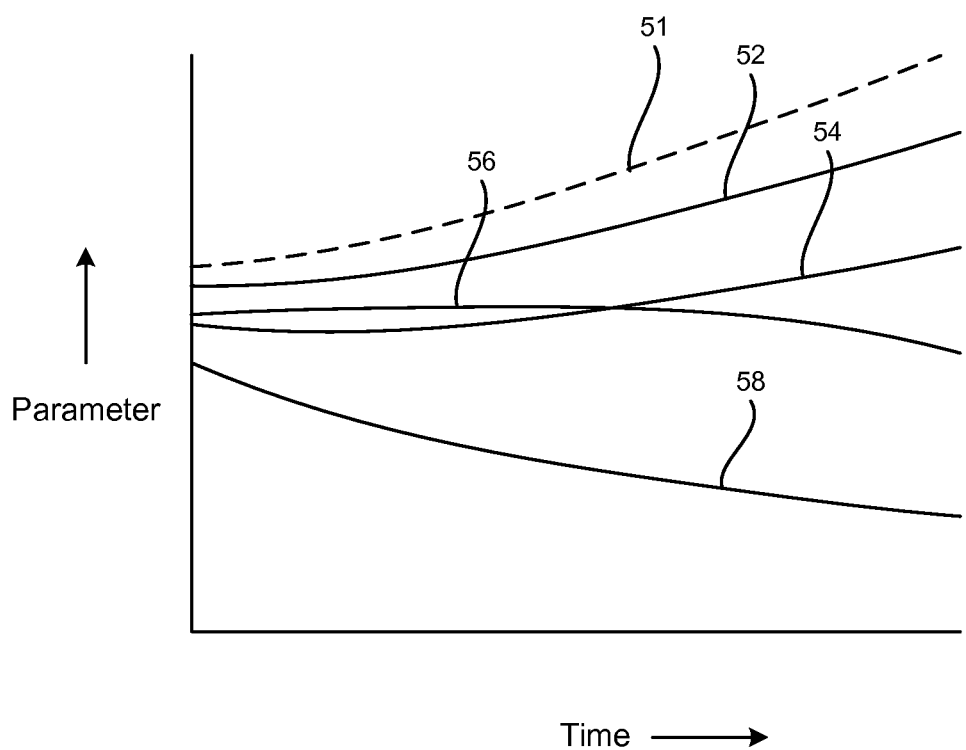
FIG. 5 is a graph that illustrates one possible representation of economic forecasts.

FIG. 5 is a graph that illustrates one possible representation of the various economic forecasts that may be produced by, for example, the core engine 479 shown in FIG. 4. The user is able to select which parameter they would like to compare (e.g. net income, net worth, total expense, assets, etc). The forecast of the selected parameter is then displayed over time based on the user-selected combination of economic unit 37 and model 39 (shown in FIG. 3), which includes a specific set of parameters, assumptions, events, and/or strategies. Under one combination of economic unit 37 and model 39 inputs, the selected parameter may result in graphic trace 58. This parameter trace can then be compared to a parameter trace 52 which may represent a different set of assumptions, events, and strategies that constitute a given model.

For example, trace 58 may represent net worth in an environment where expenses exceed income. Trace 52 may represent the net worth based on a set of assumptions, events, and strategies where there is increased income and reduced expenses. Other traces such as 54 and 56 can represent a different combination of assumptions, events, and/or strategies. In this way, a user can use the graph to compare the value of key parameters based on different economic choices. The user could then determine which economic choices to pursue based on which outcome is most desirable. Other comparisons may be included in the model as well. For example trace 51 may represent a third party benchmark such as the national average net worth projections provided by a government agency or referenced in a research paper.

In one general aspect, a non-transitory computer-readable storage medium can be configured to store instructions that when executed cause a processor to perform a process. The process can include receiving, at a first economic conversion block, a first set of input economic information associated with a user identifier, and mapping at least a portion of the first set of input economic information into a first processing format compatible with processing performed by a first processing engine. The process can include receiving, at a second economic conversion block, a second set of input economic information associated with the user identifier. The first economic conversion block and the second economic conversion block can be included in a library of conversion blocks. The process can also include mapping at least a portion of the second set of input economic information into a second processing format compatible with processing performed by a second processing engine different from the first processing engine, the second processing format being different than first processing format.

In some implementations, the process can include producing an economic forecast for the user identifier based on processing performed by the first processing engine and processing performed by the second processing engine. In some implementations, the user identifier can be a first user identifier, and the process can include receiving, at the first economic conversion block, a set of input economic information associated with a second user identifier, and mapping at least a portion of the set of input economic information associated with the second user identifier into the first processing format compatible with processing performed by the first processing engine. In some implementations, the process can include producing an economic forecast for the second user identifier based on processing performed by the first processing engine.

In some implementations, the first set of input economic information includes at least a portion of the second set of input economic information. In some implementations, the first processing engine is a financial processing engine configured to perform a financial analysis based on the first set of input economic information and the second processing engine is a utility processing engine configured to perform a utility analysis based on the second set of input economic information. In some implementations, the first economic conversion block and the second economic conversion block are included in a library of conversion blocks.

In some implementations, the first economic conversion block is included in a plurality of economic conversion blocks independently configured to produce an output compatible with the first processing format compatible with processing performed by the first processing engine. In some implementations, the process can include producing, at an aggregator, a stream of packets including a first portion designated for processing based on the first processing format associated with the first processing engine and a second portion designated for processing based on the second processing format associated with the second processing engine. In some implementations, the first set of input economic information includes at least one of a representation of an assumption, a representation of an event, or a representation of a strategy.

In another general aspect, a non-transitory computer-readable storage medium can be configured to store instructions that when executed cause a processor to perform a process. The process can include receiving, at a first processing engine, a first portion of parsed economic data targeted for processing at the first processing engine and compatible with a first processing format associated with the first processing engine, and receiving, at a second processing engine, a second portion of the parsed economic data targeted for processing at the second processing engine and compatible with a second processing format associated with the second processing engine. The parsed economic data can be produced by an aggregator based on a first set of input financial information mapped by a first economic conversion block and based on a second set of input financial information mapped by a second economic conversion block.

In some implementations, the process can include producing processed economic data at the first processing engine and the second processing engine where the processed economic data includes a plurality of economic models. In some implementations, the first processing engine is a financial processing engine configured to perform a financial analysis and the second processing engine is a utility processing engine configured to perform a utility analysis. In some implementations, the process can include receiving, at a third processing engine, a third portion of the parsed economic data targeted for processing at the third processing engine and compatible where the third processing engine is a time preference processing engine configured to perform a time preference analysis. In some implementations, at least a portion of the plurality of economic conversion blocks being independently functioning economic conversion blocks.

In some implementations, the first portion of the parsed economic data is based on at least a portion of the first set of input financial information and a portion of the second set of input financial information. In some implementations, the process can include processing the first portion of the parsed economic data at the first processing engine, the processing of the first portion of the parsed economic data including processing based on a feedback loop, and processing the second portion of the parsed economic data the second processing engine where at least a portion of the processing of the first portion of the parsed economic data and at least a portion of the processing of the second portion of the parsed economic data is performed in parallel.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit) or any derivative of the above.

Processors suitable for the processing of a computer program include, by way of example, both general and special purpose microprocessors, and any one or more processors of any kind of digital computer. Generally, a processor will receive instructions and data from a read-only memory or a random access memory or via a network connection or a combination of any of the above. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, front-end components, and/or so forth Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

What is claimed is:

1. An apparatus, comprising:
a set of economic conversion blocks configured to be modularly selected by a user from a library of economic conversion blocks and defining an economic unit, each conversion block from the set of economic conversion blocks representing at least one item in a user's life;
each of the set of economic conversion blocks each configured to receive a set of parameter values that define a unique instance of each selected economic conversion block included in the set of economic conversion blocks,
the economic unit corresponding with economic unit configuration data configured to trigger processing at a subset of a plurality of economic unit processing engines, each such economic unit processing engine corresponding to a specific economic conversion block and encapsulating processing logic for how such economic conversion block contributes to at least one of financial, time, and utility considerations of the economic unit over an economic forecast horizon associated with a forecast;
at least one set of model conversion blocks, each such set of model conversion blocks defining a model, each such model representing at least one of an assumption, an event, or a strategy that change the economic forecast for the economic unit, and constitute at least one possible future for the economic unit, each model conversion block from the at least one set of model conversion block configured to receive at least one of assumption data, event data, or strategy data; and
each model defined by the at least one set of model conversion blocks corresponding with model configuration data, the model configuration data configured to trigger processing at a subset of a plurality of model processing engines corresponding with the at least one set of model conversion blocks, each such model processing engine encapsulating processing logic for how the respective model conversion block modifies the parameters of at least one of the economic conversion blocks or contributes to the at least one of the financial, time, and utility considerations of the economic unit over the forecast horizon, the subset of the plurality of economic unit processing engines being combined with the subset of the plurality of model processing engines to produce a set of alternative economic forecasts, one for each model defined by the at least one set of model conversion blocks.

2. The apparatus of claim 1, further comprising:
receiving a definition of the economic unit via a collaborative sharing environment.

3. The apparatus of claim 1, further comprising:
receiving the set of parameter values via a collaborative sharing environment.

4. The apparatus of claim 1, wherein the set of model conversion blocks are selected from a library of model conversion blocks based on the at least one of the assumption data, the event data, the strategy data.

5. The apparatus of claim 1, further comprising:
the model being shared via a collaborative sharing environment.

6. The apparatus of claim 1, wherein the user is a first user, the process further comprising:
receiving, at the each of the set of economic conversion blocks, a set of parameter values associated with a second user;
mapping at least a portion of the set of parameter values associated with the second user into a processing format compatible with processing performed by the subset of the plurality of economic unit processing engines; and
producing an economic forecast for the second user based on processing performed by the subset of the plurality of economic unit processing engine.

7. The apparatus of claim 1, wherein the subset of the plurality of economic unit processing engines includes a first economic unit processing engine configured to trigger a financial analysis, a second economic unit processing engine configured to trigger a utility analysis, and a third economic unit processing engine configured to trigger a time preference analysis.

8. The apparatus of claim 1, wherein at least a portion of the library of economic conversion blocks is shared into the library of economic conversion blocks via a collaborative sharing environment.

9. The apparatus of claim 1, the process further comprising:
producing, at an aggregator, a stream of packets including the economic unit configuration data and parsed parameter values designated for processing based on a processing format associated with the subset of the plurality of economic unit processing engines.

10. An apparatus, comprising:
a set of economic conversion blocks configured to be modularly selected from a library of economic conversion blocks and associated with parsed economic data;
an economic unit processing engine configured to receive a first portion of the parsed economic data targeted for processing at the economic unit processing engine based on economic unit configuration data;
a set of model conversion blocks configured to be modularly selected from a library of model conversion blocks and associated with the parsed economic data;
a model processing engine configured to receive a second portion of the parsed economic data targeted for processing at the model processing engine, which encapsulates processing logic, based on model configuration data, the parsed economic data including at least one of parsed assumption data, parsed event data, and parsed strategy data,
the first and second portions of the parsed economic data each defining a relationship between the economic unit processing engine and the model processing engine;
a core engine configured to produce an economic forecast based on coordinating processing at the economic unit processing engine and processing at the model processing engine using the economic unit configuration data and the model configuration data;
a forecast generator configured to perform steps whereby the core engine produces a preliminary forecast over time, based on the first portion of the parsed economic data; and
a post processing engine in conjunction with the economic unit processing engine and the model processing engine, configured to evaluate at least one of financial, time, and utility factors of the preliminary forecast against the second portion of the parsed economic data to modify at least one of the financial, the time, or the utility factors according to a combination of assumption, event, or strategy preferences to produce a modified forecast,
the forecast generator and post processing engine configured to iteratively process the modified at least one of the financial, the time, or the utility factors until a final forecast is produced.

11. The apparatus of claim 10, wherein the economic forecast is included in a plurality of economic forecasts produced by the core engine, the plurality of economic forecasts including a first economic forecast produced based on a first combination of a financial analysis, a utility analysis, and a time preference analysis, the plurality of economic forecasts including a second economic forecast produced based on a second combination of the financial analysis, the utility analysis, and the time preference analysis.

12. The apparatus of claim 10, wherein the core engine is configured to produce the economic forecast based on a financial analysis, a utility analysis, and a time preference analysis.

13. The apparatus of claim 10, wherein the economic unit processing engine is selected from a plurality of economic unit processing engines based on the economic unit configuration data,
the model processing engine is selected from a plurality of model processing engines based on the model configuration data.

14. The apparatus of claim 10, wherein the economic forecast is a preliminary forecast,
the process further comprising:
performing a check of the preliminary forecast based on a check condition associated with a model;
modifying at least the parsed economic data based on the check; and producing at least one of an intermediate forecast or a final forecast based on the modified parsed economic data.

15. The apparatus of claim 10, wherein financial analysis is performed by a financial processing element of the economic unit processing engine, utility analysis is performed by a utility processing element of the economic unit processing engine, and time preference analysis is performed by a time preference element of the economic unit processing engine.

16. The apparatus of claim 10, wherein at least one of financial analysis, utility analysis, or time preference analysis is modified by at least one of processing of parsed assumption data performed by an assumption module of the model processing engine, processing of parsed event data performed by an event module of the model processing engine, or processing of parsed strategy data performed by a strategy module of the model processing engine.

* * * * *